United States Patent [19]

Shigemura et al.

[11] Patent Number: 4,650,347
[45] Date of Patent: Mar. 17, 1987

[54] TEMPERATURE DETECTOR

[75] Inventors: Yutaka Shigemura, Takarazuka; Hiroshi Kimura, Habikino; Masahiko Hisajima, Osaka; Isao Yada, Neyagawa; Shinobu Satonaka, Toyonaka; Seiji Kaminaga, Hirakata, all of Japan

[73] Assignee: Mita Industrial Co., Ltd., Japan

[21] Appl. No.: 762,670

[22] Filed: Aug. 5, 1985

Related U.S. Application Data

[62] Division of Ser. No. 451,184, Dec. 20, 1982, Pat. No. 4,551,009.

[30] Foreign Application Priority Data

| Dec. 21, 1981 | [JP] | Japan | 56-207562 |
| Dec. 28, 1981 | [JP] | Japan | 56-212707 |
| Dec. 28, 1981 | [JP] | Japan | 56-198684 |
| Dec. 29, 1981 | [JP] | Japan | 56-210298 |
| Dec. 29, 1981 | [JP] | Japan | 56-210299 |
| Jan. 13, 1982 | [JP] | Japan | 57-4216 |
| Jan. 18, 1982 | [JP] | Japan | 57-6657 |
| Jan. 19, 1982 | [JP] | Japan | 57-7090 |

[51] Int. Cl.$^4$ ............................ G01K 1/14; H03H 7/54
[52] U.S. Cl. .................................... 374/141; 219/494; 307/310; 323/354
[58] Field of Search ................ 374/141, 170, 183, 153; 323/354; 219/494; 307/310

[56] References Cited

U.S. PATENT DOCUMENTS

| 2,712,236 | 7/1955 | Bennett et al. | 374/153 |
| 3,357,249 | 12/1967 | Bernous et al. | 374/153 |
| 3,449,599 | 6/1969 | Henry | 307/310 |
| 3,559,883 | 2/1971 | Buiting | 374/185 X |
| 3,946,307 | 3/1976 | Mori et al. | 374/185 |
| 3,973,147 | 8/1976 | Yu | 307/310 |
| 4,016,483 | 4/1977 | Rudin | 323/354 |
| 4,206,648 | 6/1980 | Tuska et al. | 374/171 |
| 4,380,155 | 4/1983 | Paddock et al. | 364/557 X |
| 4,403,296 | 9/1983 | Prosky | 364/557 X |
| 4,406,550 | 9/1983 | Gray | 374/170 X |
| 4,428,528 | 1/1984 | Renault | 364/557 |
| 4,505,600 | 3/1985 | Suzuki et al. | 374/170 |
| 4,521,761 | 6/1985 | Burton | 323/354 |

Primary Examiner—Daniel M. Yasich
Attorney, Agent, or Firm—Beveridge, Degrandi & Weilacher

[57] ABSTRACT

An electrostatic copying apparatus having a semiautomatic document supplying and discharging device and a sorter in addition to its main body. The main body of the apparatus includes a rotatable photosensitive member, a device for forming a latent electrostatic image on the photosensitive member, a developer, a transfer device, a device for conveying a copying paper, a cleaner and a heat fixing device. Various improvements have been made in the manner of controlling cleaning, the manner of controlling the delivery of a copying paper, the manner of controlling troubleshooting and display, the manner of controlling interrupting copying, the manner of controlling heating, the manner of distribution electric power, etc. The heating is controlled by a parallel network of linear circuits including a temperature detector and a multi-element voltage dividing circuit, the elements of which can be switched into and out of operation to alter the sensed temperature to which the network responds.

8 Claims, 10 Drawing Figures

TEMPERATURE DETECTOR

This is a division of application Ser. No. 451,184, filed Dec. 20, 1982, now U.S. Pat. No. 4,551,009 issued Nov. 5, 1985.

FIELD OF THE INVENTION

This invention relates to certain improvements in detection of temperature within an electrostatic copying apparatus.

DESCRIPTION OF THE PRIOR ART

Electrostatic copying apparatuses of various types have been suggested and come into commercial acceptance in the past. In a typical electrostatic copying apparatus, a rotating drum having a photosensitive member disposed on its peripheral surface is provided, and around the rotating drum are located a charging zone, an exposure zone, a developing zone, a transfer zone, a peeling zone and a cleaning zone in this order in the rotating direction of the rotating drum. In the charging zone, the photosensitive member is charged to a specified polarity by the action of a charging corona discharge device, and in the exposure zone, the image of a document to be copied is projected onto the photosensitive member, whereby the charge on the photosensitive member is selectively eliminated and a latent electrostatic image is formed on the photosensitive member. In the developing zone, a toner is applied to the latent electrostatic image on the photosensitive member by, for example, a developing means of the magnetic brush type to develop the latent electrostatic image into a toner image. In the transfer zone, the toner image on the photosensitive member is transferred onto a copying paper conveyed through the transfer zone. In the peeling zone, the copying paper contacted with the photosensitive member in the transfer zone is peeled off from the photosensitive member. In the cleaning zone, the toner remaining on the photosensitive member after the transfer is removed by, for example, the action of a cleaning blade to be in contact with the photosensitive member. In the meantime, the copying paper having the toner image transferred thereto, which has been peeled from the photosensitive member in the peeling zone, is passed through a fixing device such as a heat fixing device whereby the toner image is fixed to the copying paper in the fixing device.

The conventional electrostatic copying apparatus, however, has various inconveniences or defects in regard to the following operations and devices which will be described in detail hereinafter.

(1) Control based on the temperature of the surface or its vicinity of the photosensitive member;

(2) Control of the energization or deenergization of an electric heating means when a heat-fixing device containing the electronic heating means is used;

(3) Control of distributing an electric power when the heat-fixing device having the electric heating means is used; and (4) electrical detecting devices for temperature, etc.

SUMMARY OF THE INVENTION

The general object of this invention is to remove the various inconveniences and defects existing in conventional electrostatic copying apparatuses and to improve such apparatuses in various respects.

Various specific objects of this invention will become apparant from the following detailed description of the invention taken in conjunction with the accompanying drawings.

DETAILED DESCRIPTION OF THE PREFERRED EMBODIMENTS

The invention will be described in detail with reference to the accompanying drawings.

General Outline of Copying Apparatus

The outline of the construction of one embodiment of an electrostatic copying apparatus improved variously in accordance with this invention will be described.

Figure 1:
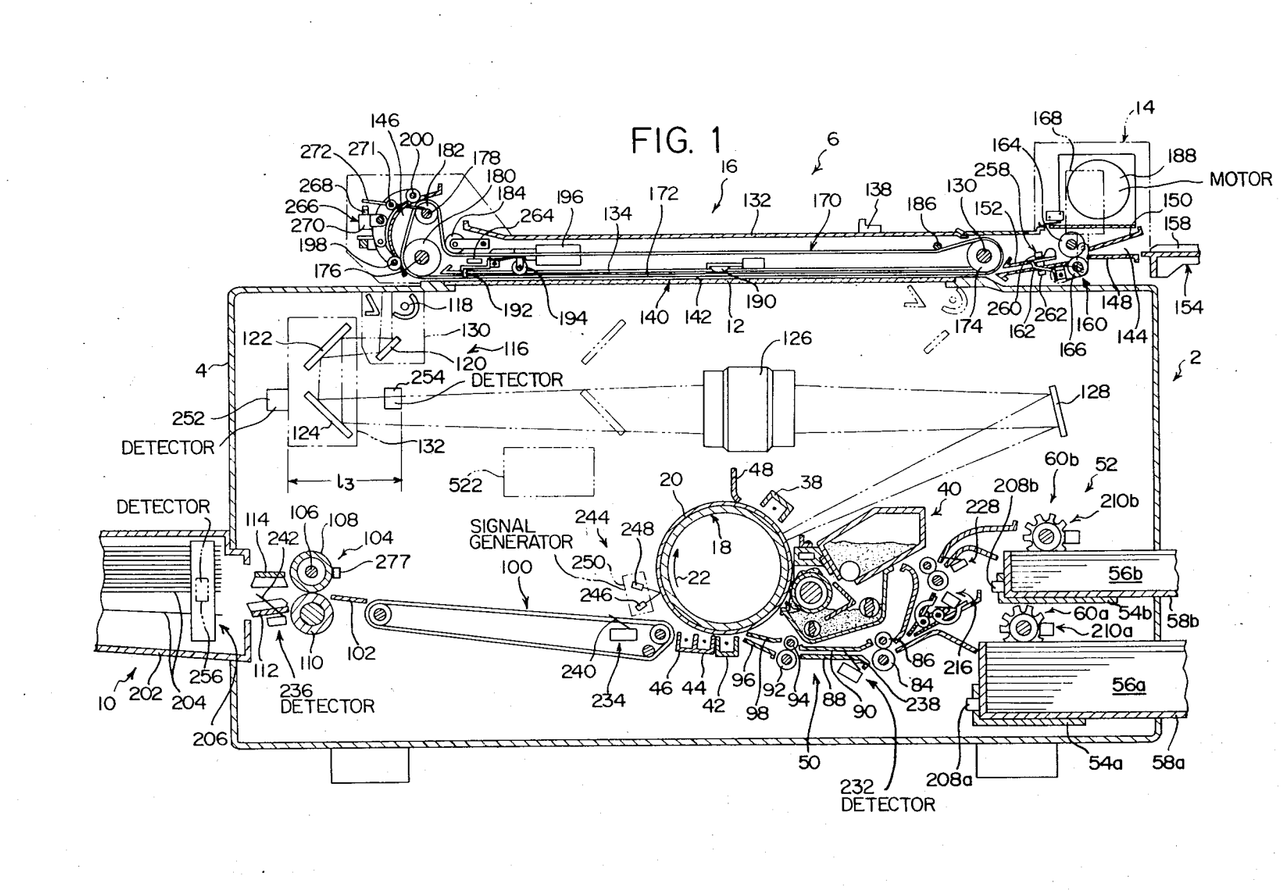
FIG. 1 is a simplified sectional view of a copying apparatus incorporating a temperature detector in accordance with a preferred embodiment of the present invention.
Figure 2:
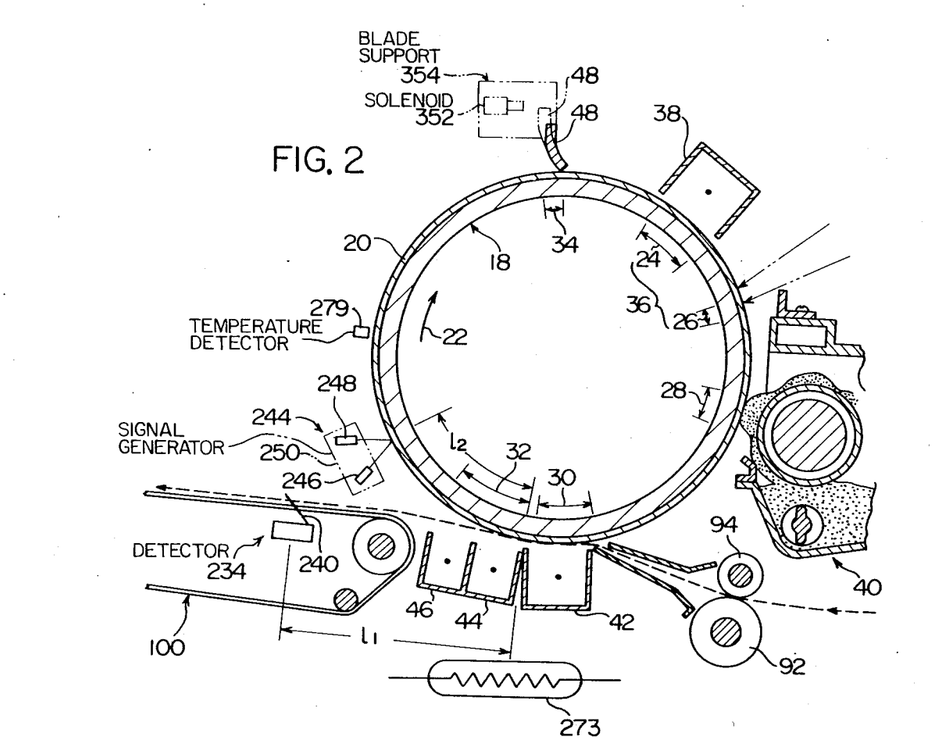
FIG. 2 is a simplified partial sectional view showing a rotating drum and its vicinity in the copying apparatus shown in FIG. 1.

With reference to FIGS. 1 and 2, the illustrated electrostatic copying apparatus has a main body shown generally at 2 which includes a nearly rectangularly-shaped housing 4. The copying apparatus further includes a semi-automatic document supplying and discharging device shown generally at 6 and annexed to the upper surface of the housing 4, and a sorter shown generally at 10 and annexed to one side surface of the housing 4.

With reference to FIG. 1, the main body 2 of the copying apparatus will be described. The transparent plate 12 on which to place a document to be copied is disposed on the upper surface of the housing 4. A cylindrical rotating drum 18 is rotatably mounted substantially centrally at the lower part of the housing 4, and an endless photosensitive member 20 is provided on the peripheral surface of the rotating drum 18. It is also possible to use an endless belt element known to those skilled in the art in place of the rotating drum 18 and to dispose the photosensitive member on the surface of the endless belt element. With reference to FIG. 2 together with FIG. 1, around the rotating drum to be rotated in the direction of an arrow 22 are located a charging zone 24, an exposure zone 26, a developing zone 28, a transfer zone 30, a peeling zone 32 and a cleaning zone 34 in this sequence as viewed in the rotating direction of the rotating drum 18. The charging zone 24 and the exposure zone 26, taken together, form a latent electrostatic image-forming zone 36. A charging corona discharge device 38 is disposed in the charging zone 24, and a developing means 40 of the magnetic brush type in any desired form is disposed in the developing zone 28. A transfer corona discharge device 42 is disposed in the transfer zone 30, and peeling corona discharge devices 44 and 46 are disposed in the peeling zone 32. In the cleaning zone 34, a cleaning blade 48 is provided.

A paper conveying means shown generally at 50 is provided in the lower portion of the housing 4. A paper feed device 52 is disposed at the upstream end portion (the right end portion in FIG. 1) of the paper conveying means 50. The paper feed device 52 includes a first cassette-receiving section 54a and a second cassette-receiving section 54b located above it. The first cassette-receiving section 54a receives a paper cassette 58a containing a plurality of stacked copying paper sheets 56a, and the second cassette-receiving section 54b receives a paper cassette 58b containing a plurality of stacked copying paper sheets 56b. A first paper supply means 60a and a second paper supply means 60b are provided respectively in the first cassette-receiving section 54a and the second cassette-receiving section 54b. To the first cassette-receiving section 54a is annexed a first paper introducing passage 70a defined by a pair of guide plates 66 and 68. Likewise, a second paper introducing passage 70b defined by a pair of guide plates 72 and 74 and a pair of guide plates 76 and 78 is annexed to the second cassette-receiving section 54b. A pair of supply assisting rollers 80 and 82 are provided between the pair of guide plates 72 and 74 and the pair of guide plates 76 and 78. A pair of conveyor rollers 84 and 86 are provided at a point of junction of the first paper introducing passage 70a and the second paper introducing passage 70b, and following this pair of conveyor rollers 84 and 86, a pair of guide plates 88 and 90, a pair of conveyor rollers 92 and 94 and a pair of guide plates 96 and 98 are provided. The downstream end of the pair of guide plates 96 and 98 extend to the upstream end of the transfer zone 30. A conveyor belt mechanism 100 is disposed downstream of the peeling zone 32 as viewed in the paper conveying direction. A guide plate 102 is disposed downstream of the conveyor belt mechanism 100, and a heat-fixing device 104 is disposed downstream of the guide plate 102. The heat-fixing device 104 is comprised of a heating roller 108 having an electrical heating means 106 therein, and a press-contact roller 110 cooperating with the heating roller 108. A pair of guide plates 112 and 114 are disposed downstream of the heat-fixing device 104. In the paper conveying means 50 of the aforesaid construction, a copying paper is supplied through the first paper introducing passage 70a from the paper cassette 58a in the paper feed device 52 or through the second paper introducing passage 70b from the paper cassette 58b, and conveyed to the transfer zone 30 by the pair of conveyor rollers 84 and 86, the pair of guide plates 88 and 90, the pair of conveyor rollers 92 and 94, and the pair of guide plates 96 and 98. The paper is brought into contact with the photosensitive member 20 on the rotating drum 18 in the transfer zone 30, then peeled from the photosensitive member 20 in the peeling zone 32, thereafter conveyed by the conveyor belt mechanism 100, introduced into the heat-fixing device 104 via the guide plate 102, and thereafter passed through the pair of guide plates 112 and 114 and discharged into the sorter 10.

In the upper portion of the housing 4, there is provided an optical unit generally shown at 116 for scanning and exposing a document on the transparent plate 12 and projecting its image onto the photosensitive member 20 on the rotating drum 18 in the exposure zone 26. The optical unit 116 has a document illuminating lamp 118 for illuminating the document placed on the transparent plate 12, a first reflecting mirror 120 for projecting the reflected light from the document onto the photosensitive member 20, a second reflecting mirror 122, a third reflecting mirror 124, a lens assembly 126 and a fourth reflecting mirror 128. During scanning and exposure, the document illuminating lamp 118 and the first reflecting mirror 120 which are mounted on a common support frame 130 are moved substantially horizontally at a predetermined speed V from their initial position shown by the solid line to required positions (for example, maximum scanning-exposure termination positions shown by the two-dot chain line), and the second reflecting mirror 122 and the third reflecting mirror 124 which are mounted on a common support frame 132 are moved at a speed one half of the aforesaid speed (i.e., ½ V) from their initial positions shown by the solid line to required positions (for example, maximum scanning-exposure termination positions shown by the two-dot chain line). At this time, the light reflected from the document illuminated by the document illuminating lamp 118 is reflected successively by the first reflecting mirror 120, the second reflecting mirror 122 and the third reflecting mirror 124 and reaches the lens assembly 126. Thereafter, it is reflected by the fourth reflecting mirror 126 and reaches the photosensitive member 20 in the exposure zone 26. When the scanning exposure is terminated, the document illuminating lamp 118, the first relfecting mirror 120, the second reflecting mirror 122 and the third reflecting mirror 124 are returned to their initial positions shown by the solid line.

In the main body 2 of the copying apparatus described above, while the rotating drum is rotated in the direction of arrow 22, the charging corona discharge device 38 substantially uniformly charges the photosensitive member 20 to a specified polarity in the charging zone 24, and thereafter in the exposure zone 26, the optical unit 116 projects the image of the document to eliminate the cahrge on the photosensitive member 20 selectively, whereby a latent electrostatic image corresponding to the document is formed on the photosensitive member 20. Thereafter, the developing means 40 applies a toner to the latent electrostatic image on the photosensitive member 20 to develop the latent electrostatic image to a toner image. Then, in the transfer zone 30, a copying paper conveyed by the paper conveying means 50 is brought into contact with the photosensitive member 20, and by the action of the transfer corona discharge device 42, the toner image on the photosensitive member 20 is transferred to the paper. Subsequently, in the peeling zone 32, the copying paper is peeled from the photosensitive member 20 by the action of the peeling corona discharge devices 44 and 46. The copying paper having the toner image transferred thereto is then conveyed to the heat-fixing device 104 where the toner image is fixed to the copying paper. The paper is then discharged into the sorter 10. In the meantime, the photosensitive member 20 continues to rotate, and the toner remaining on the photosensitive member 20 after the transfer operation is removed from it by the action of the cleaning blade 48 in the cleaning zone 34 or by the action of the magnetic brush-type developing means 40 in the developing zone 28 (the removal of the residual toner from the photosensitive member 20 will be described in more detail hereinafter).

A temperature detecting means 277 (FIG. 1) for detecting the temperature of the heat-fixing device 104 and a temperature detecting means 279 (FIG. 2) for detecting the temperature of the surface or its vicinity of the photosensitive member 20 are further provided. Detecting devices 281 and 283 respectively including the temperature detecting means 277 and 279 produce not only a temperature signal but also a signal showing a disorder which occurs in the temperature detecting means 277 and 279, as will be described in detail hereinbelow.

Controlling on the Basis of the Temperature of the Surface or its Vicinity of the Photosensitive Member In the electrostatic copying apparatus improved in accordance with this invention, the electrical heating means 237 for heating the photosensitive member 20 as described hereinabove is provided. The electrical heating means 237 (FIG. 2) is constructed of, for example, a heater. With reference to FIG. 2, the electrical heating means 237 is disposed beneath the transfer corona discharge device 42 within the housing 4 (FIG. 1). Preferably, the electrical heating means 237 is disposed in proximity to the photosensitive member 20. It can be provided at a suitable position inwardly or outwardly of the rotating drum 18.

Figure 3:
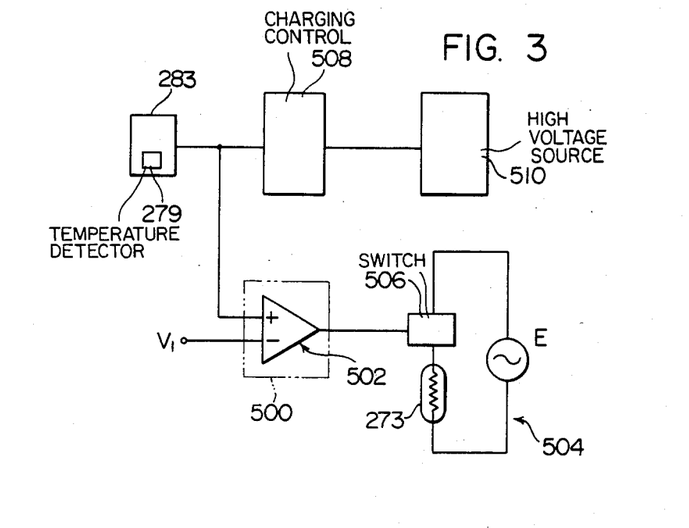
FIG. 3 is a schematic view showing a control system for controlling a charging corona discharge device and an electric heating means in the copying apparatus shown in FIG. 1.

In the electrostatic copying apparatus, a control system shown in FIG. 3 is provided in relation to the electrical heating means 237. The control system includes a detecting device 283 including the temperature detecting means 279 for detecting the temperature of the surface or its vicinity of the photosensitive member 20 and a heating control means 500 included in the processing means 306. The temperature detecting means 279 can be constructed of a detecting means for example a thermistor whose resistance value decreases with a rise in the detected temperature. The output voltage of the detecting device 283 is increased in proportion to the detected temperature of the temperature detecting means 279. In the illustrated embodiment, this detecting device 283 is provided in proximity to the photosensitive member 20 downstream of the peeling corona discharge device 46 as viewed in the rotating direction of the rotating drum 18 shown by the arrow 22 (FIG. 2). The heating control means 500 comprises a comparator 502. In this control system, the output voltage from the detecting device 283 based on the temperature detected by the temperature detecting means 279 is fed to a non-inverted input of the comparator 502 of the heating control means 500. A reference voltage $V_1$ is applied to a inverted input of the comparator 502. The reference voltage $V_1$ is set at a voltage equal to the output voltage from the detecting device 283 at a predetermined temperature (35° C. in the illustrated embodiment) at which dew formation on the surface of the photosensitive member 20 can be prevented and the charging voltage of the photosensitive member 20 can be maintained at a right value. The output signal from the comparator 502 is fed into a normally closed switch means 506 disposed in a heating control circuit 504, and the switch means 506 is opened or closed by this output signal. In the heating control circuit 504, the electrical heating means 273 is connected to a suitable power supply E such as a commercial AC power supply through the switch means 506. Hence, when the switch means 506 is closed, the electrical heating means 273 is energized, and when the switch means 506 is opened, the electrical heating means 273 is deenergized.

The output voltage of the detecting device 283 which is based on the temperature detected by the temperature detecting means 279 is also fed into a charging control means 508 included in the processing means 306. The output signal from the charging control means 508 is fed into a high voltage source 510 such as a high voltage transformer, and on the basis of this output, the output voltage of the high voltage source 510 is controlled. The charging control means 508 controls the output voltage of the high voltage source 510 on the basis of the output voltage of the detecting device 283, and acts to increase and decrease the output voltage of the high voltage source 510 substantially in proportion to the rising and falling of the output voltage of the detecting device 279, or in other words, to the rising and falling of the temperature detected by the detecting device 279. The output signal of the high voltage source 510 is fed into the charging corona discharge device 38.

With reference to FIGS. 2 and 3, the operation and effect of the electrostatic copying apparatus equipped with the control system described above will be described.

When the temperature of the surface or its vicinity of the photosensitive member 20 is below a relatively low predetermined value (35° C. in the illustrated embodiment), the output voltage from the detecting device 283 is lower than, or equal to, the reference voltage $V_1$, and the output signal of the comparator 502 becomes zero. Hence, the switch means 506 is closed, and the electrical heating means 273 is energized to thereby heat the photosensitive member 20. When the photosensitive member 20 is heated and the temperature of its surface or its vicinity rises, the charging control means 508 controls the output voltage of the high voltage source 510 on the basis of the output voltage from the detecting device 283, and increases the output voltage of the high voltage source 510 in proportion to the rise of the above temperature.

On the other hand, when the photosensitive member 20 is heated by the electrical heating means 273 and the temperature of the surface or its vicinity of the photosensitive member 20 exceeds a predetermined value (35° C. in the illustrated embodiment), the output voltage from the detecting device 283 becomes larger than the reference voltage $V_1$, and the output signal of a predetermined voltage from the comparator 502 is fed into the switch means 506. As a result, the switch means 506 operates and becomes open, whereby the electrical heating means 273 is deenergized, and the heating of the photosensitive member 20 is stopped. When the heating of the photosensitive member 20 is stopped and the temperature of the surface or its vicinity of the photosensitive member 20 drops, the charging control means 508 controls the output voltage of the high voltage source 510 on the basis of the output voltage from the detecting device 283, and the output voltage of the high voltage source 510 is decreased in proportion to the dropping of the temperature.

As stated hereinabove, in the electrostatic copying apparatus equipped with the aforesaid control system, the temperature of the surface or its vicinity of the photosensitive member 20 is maintained approximately at a predetermined value (35° C. in the illustrated embodiment) by the energization or deenergization of the electrical heating means 273. It is possible therefore to prevent dew formation on the surface of the photosensitive member 20 and to obtain a copied image of good quality.

Furthermore, since the voltage applied to the charging corona discharge device 38 by the action of the charging control means 508 is increased and decreased in proportion to the rise and fall of the temperature of the surface or its vicinity of the photosensitive member 20, the charge potential applied to the surface of the photosensitive member 20 by the charging corona discharge device 38 can be controlled to a right value depending upon the aforesaid temperature, and a copied image of good quality can therefore be obtained.

Control of Heating the Heat Fixing Device

Figure 4:
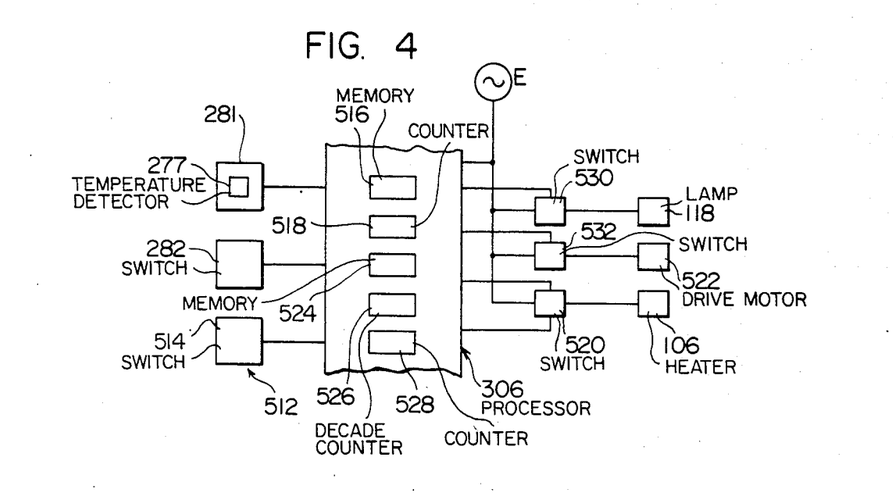
FIG. 4 is a schematic view showing a control system for controlling an electrical heating means of a heat fixing device in the copying apparatus shown in FIG. 1.

In the electrostatic copying apparatus improved in accordance with this invention, a control system illustrated in FIG. 4 is provided in relation to the heat fixing device 104 (FIG. 1). The control system further includes a power saving means 512 and a heating control means (not shown) included in the processing means 306, in addition to the power switch 282 and the detecting device 281 including the temperature detecting means 277 for detecting the temperature of the heat fixing device 104. The temperature detecting means 277 is provided in contact with, or in proximity to, the surface of the heating roller 108 (FIG. 1) in the heat fixing device 104, and detects the temperature of the surface or its vicinity of the heating roller 108. Such a temperature detecting means 277 can be constructed of, for example, a thermistor. The power saving means 512 comprises a power saving switch 514 disposed on the panel 280, and produces a power saving signal when manually closed. The heating control means of the processing means 306 includes a memory 516 and a first heater counter 518. A first predetermined value $T_1$, a second predetermined value $T_2$ and a third predetermined value $T_3$ are stored in the memory 516. The first predetermined value $T_1$ is set at a temperature (about 180° C. in the illustrated embodiment) which is suitable for heat fixing the toner image on the copying paper by the heat fixing device 104. The second predetermined value $T_2$ is set at a suitable temperature (190° C. in the illustrated embodiment) which is higher than the first predetermined temperature value $T_1$ ($T_1 < T_2$). The third predetermined value $T_3$ is set at a suitable temperature (160° C. in the illustrated embodiment) which is higher than the softening temperature of the toner but is lower than the first predetermined value $T_1$ ($T_3 < T_1$). The first heater counter 518 is comprised of a backup-type counter, and begins counting up when the power switch 282 is closed, and begins counting down when the power switch 282 is opened. A detailed description of the detecting device 281 is omitted here since it is given hereinafter.

In the above control system, the output signals of the power switch 282 and the detecting device 281 including the temperature detecting means 277 (FIG. 14) and the power saving signal of the power saving switch 514 are fed into the heating control means of the processing means 306. The output signal from the heating control means is fed into the switch means 520 and causes the opening and closing of the switch means 520. When the switch means 520 is closed, the electrical heating means 106 (FIG. 14) of the heat fixing device 104 is connected to a suitable power supply E such as a commercial AC power supply and energized. When the switch means 520 is opened, the aforesaid connection is released to deenergize the electrical heating means 106.

Figure 5:
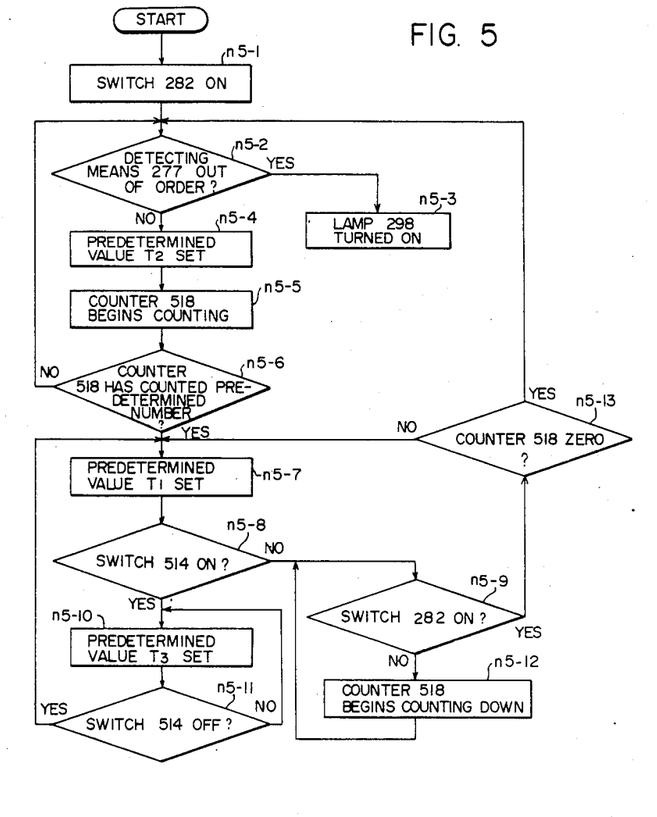
FIG. 5 is a flow chart showing the mode of controlling heating of a heat fixing device in the copying apparatus shown in FIG. 1.

The operation and effect of the heat fixing device 104 including the aforesaid control system will be described with reference to FIG. 5 showing a flow chart of the method of control by the control system described above and FIG. 6 which shows changes with time of the temperature of the surface or its vicinity of the heating roller 108. When the power switch 282 on the panel 280 is closed in step n5-1, step n5-2 sets in. In step n5-2, it is judged whether the temperature detecting means 277 is out of order (for example, when the temperature detecting means 277 is constructed of a thermistor, whether the thermistor has breaks). When the power switch 282 is closed, the electrical heating means 106 is energized to heat the heat fixing device 104 and at the same time the waiting flag 308 included in the processing means 306 is set at logic "1", whereby the waiting display lamp 296 (FIG. 6) is energized to indicate that the heat fixing device 104 is in a preparatory condition. The waiting flag 308 is reset at logic "0" once the temperature of the heat fixing device 104 detected by the temperature detecting means 277 has exceeded the second predetermined value $T_2$ as a result of heating by the electrical heating means 106. Hence, the waiting display lamp 296 is deenergized. The waiting flag 308 is set when the power saving switch 514 is closed or the power switch 282 is opened. Moreover, when the power saving switch 514 is opened and the temperature detected by the temperature detecting means 277 has exceeded the first predetermined value $T_1$, the waiting flag 308 is reset.

When in step n5-2 it is judged that the temperature detecting means 277 is out of order, step n5-3 sets in, and the service man call lamp 298 on the panel 280 is turned on, thus showing that some trouble has occurred in the copying apparatus. On the other hand, when it is judged in step n5-2 that the temperature detecting means 277 is not out of order, step n5-4 sets in, and the second predetermined value $T_2$ (about 190° C.) stored in the memory 516 in the heating control means is read out, and set [when the predetermined value $T_2$ has been set, the electrical heating means 106 is controlled based on the signal from the detecting device 281 such that the temperature of the surface or its vicinity of the heating roller 108 is adjusted substantially to the second predetermined value $T_2$ (about 190° C.)]. Then, step n5-5 sets in, and counting up of the counter 518 of the heat control means is started. Furthermore, step n5-6 sets in, and it is judged in this step whether the counter 518 has counted a predetermined number. The predetermined number is the number of counts corresponding to a first predetermined time $W_1$ from time $t_0$ to time $t_2$ in FIG. 6. Hence, when the counter 518 has counted the predetermined number, the first predetermined time $W_1$ elapses. This first predetermined time $W_1$ is, for example, 10 to 15 minutes. When in step n5-6 it is judged that the counter 518 has not counted the predetermined number, step n5-2 again sets in. When during the counting of the counter 518, the heat fixing device 104 is heated to cause the temperature of the surface or its vicinity of the heating roller 108 to exceed the second predetermined value $T_2$, the waiting flag 308 is reset at logic "0" on the basis of the signal from the temperature detecting means 277. As a result, the waiting display lamp 296 is deenergized to show that the copying process is in condition for performance. Although at this time the ambient temperature of the heat fixing device 104 is slightly lower than that in an optimal condition, the temperature of the surface or its vicinity of the heating roller 108 after the deenergization of the waiting display lamp 296 becomes the second predetermined value $T_2$ which is higher than the first predetermined value $T_1$. Hence, the toner image can be fixed satisfactorily.

On the other hand when in step n5-6 it is judged that the counter 518 has counted the predetermined number, step n5-7 sets in, and the first predetermined value $T_1$ (about 180° C.) stored in the memory 516 of the heating control menas is read out. Thus, instead of the second predetermined value $T_2$, the first predetermined value $T_1$ is set [when the predetermined value $T_1$ has been set, the electrical heating means 106 is controlled on the basis of the signal from the detecting device 281 such that the temperature of the surface or its vicinity of the heating roller 108 is adjusted substantially to the first predetermined value $T_1$ (about 180° C.)]. At this time, the counter 518 keeps maintaining the aforesaid predetermined count number. Thus, the electrical heating means 106 is controlled such that the temperature of the surface or its vicinity of the heating roller 108 is adjusted substantially to the first predetermined value $T_1$. After the time $t_3$, this temperature is maintained substantially at the first predetermined value $T_1$, and the temperature of the ambient atmosphere is maintained at an optimal value.

Figure 6:
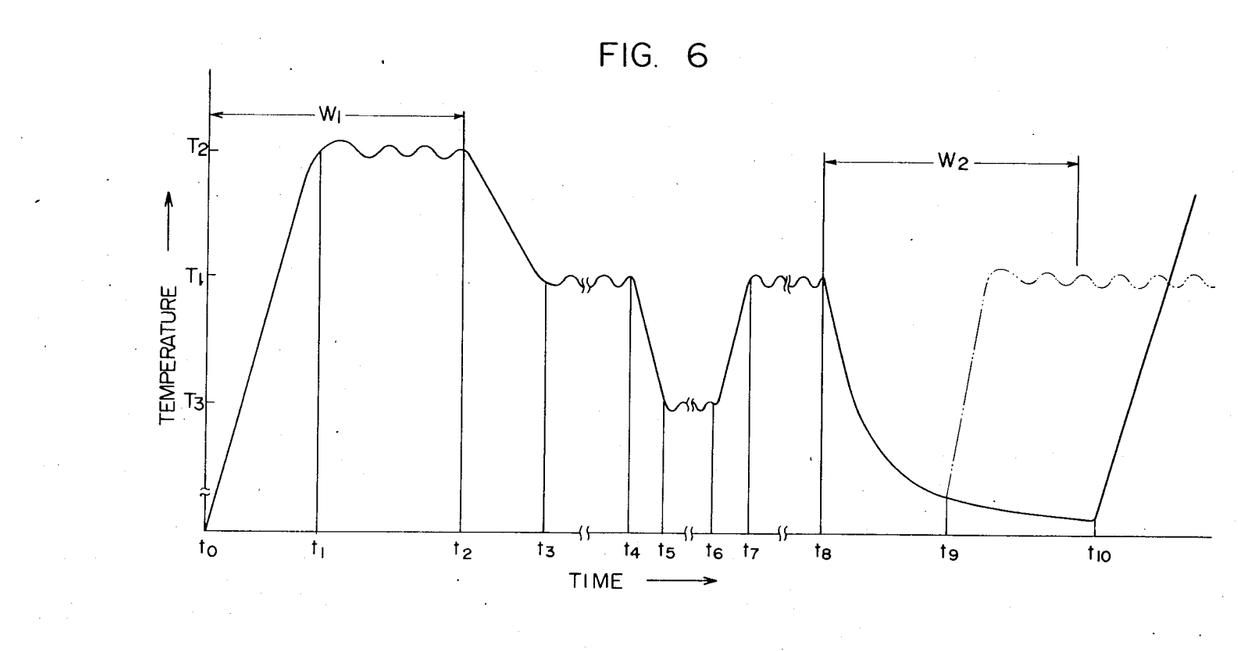
FIG. 6 is a diagram showing changes with time of the temperature of the heat fixing device in the copying apparatus shown in FIG. 1.

Accordingly, when the power switch 282 is closed to apply power, the temperature of the surface or its vicinity of the heating roller 108 is maintained substantially at the second predetermined value $T_2$ higher than the first predetermined value $T_1$ even during the time from $t_1$ to $t_2$, and thereafter is maintained substantially at the first predetermined value $T_1$ after the time $t_3$. Thus, it is maintained at a temperature optimal for the heat fixing of the toner image.

When the first predetermined value $T_1$ is set in step n5-7, step n5-8 sets in. In step n5-8, it is judged whether the power saving switch 514 is closed. When it is judged in step n5-8 that the power saving switch 514 is not closed, step n5-9 sets in. In step n5-9, it is judged whether the power switch 282 is closed. When it is judged in step n5-9 that the power switch 282 is closed, step n5-13 sets in, and it is judged in this step whether the counter 518 is zero. When it is judged in step n5-13 that the counter 518 is not zero, step n5-7 again sets in. Hence, after the time $t_3$, the temperature of the surface or its vicinity of the heating roller 108 is maintained substantially at the first predetermined value $T_1$ unless the power saving switch 514 or the power switch 282 is closed.

On the other hand, when it is judged in step n5-8 that the power saving seitch 514 is closed, step n5-10 sets in, and the third predetermined value $T_3$ (about 160° C.) stored in the memory 516 in the heating control means is read out. As a result, the third predetermined value $T_3$ is set instead of the first predetermined value $T_1$ [when the predetermined value $T_3$ has been set, the electrical heating means 106 is controlled on the basis of the signal from the detecting device 281 such that the temperature of the surface of its vicinity of the heating roller 108 is adjusted substantially to the third predetermined value $T_3$ (about 160° C.)]. When the third predetermined value $T_3$ has been set in step n5-10, step n5-11 follows. In step n5-11, it is judged whether the power saving switch 514 is opened. When it is judged in step n5-11 that the power saving switch 514 is not opened, the step n5-10 again sets in. Hence, when the power saving switch 514 is closed after the time $t_4$, the electrical heating means 106 is controlled such that the temperature of the surface or its vicinity of the heating roller 108 is adjusted substantially to the third predetermined value $T_3$. After the time $t_5$, this temperature is maintained substantially at the third predetermined value $T_3$. When the power saving switch 514 is closed, the waiting flag 308 is reset at logic "0" to energize the waiting display lamp, thus showing that the heat fixing device 104 is in a preparatory condition.

On the other hand, when it is judged in step n5-11 that the power saving switch 514 is opened, step n5-7 again sets in. In step n5-7, the first predetermined value $T_1$ stored in the memory 516 is read out, and the first predetermined value $T_1$ is set instead of the third predetermined value $T_3$ (when the predetermined value $T_1$ is set, the electrical heating means 106 is controlled such that the temperature of the surface or its vicinity of the heating roller 108 is adjusted substantially to the first predetermined value $T_1$). Thus, when the power saving switch 514 is closed, and thereafter opened at time $t_6$, the electrical heating means 106 is controlled such that the temperature of the surface or its vicinity of the heating roller 108 is adjusted substantially to the first predetermined value. After the time $t_7$, this temperature is maintained substantially at the first predetermined value $T_1$. When the power saving switch 514 is opened, and by the heating of the electrical heating means 106, the temperature of the heat fixing device 104 detected by the temperature detecting means 277 (FIG. 14) exceeds the first predetermined value $T_1$, the waiting flag 308 is reset at logic "0" to deenergize the waiting display lamp 296, thus showing that the copying process is in a preparatory condition.

When in step n5-9 it is judged that the power switch 282 is not closed, step n5-12 sets in, and the counting down of the counter 518 is started. The count down of the counter 518 is one from the predetermined number maintained in step n5-5. When the counting down of the counter 518 is performed, step n5-9 again sets in. Hence, when the power switch 282 is opened at time $t_8$, the counting down of the counter 518 is effected, and the copying apparatus is cut off from the power supply to deenergize the electrical heating means 106. Since the power supply is turned off upon the opening of the power switch 282, the waiting flag 308 is reset at logic "0" and thus the waiting display lamp 296 is also deenergized. If it is judged in step n5-9 that the power switch 282 is closed before the number held by the counter 518 becomes zero by the counting down of the counter 518 from the predetermined number in step n5-12 (that is to say, beofre the lapse of a second predetermined time $W_2$ to be described after the opening of the power switch 282), step n5-13 sets in. In step n5-13, it is judged whether the counted value of the counter 518 is zero. Thereafter, step n5-7 again sets in, and the first predetermined value $T_1$ is set in the heating control means. In this case, the counting up of the counter 518 is also started although it is not shown in the flow chart. The counting up can be carried out from the count down number kept in the counter 518 to the predetermined number. Hence, when at time $t_9$ after the opening of the power switch 282 but before the lapse of the second predetermined time $W_2$, the power switch 282 is again closed to turn on the power supply, the electrical heating means 106 is controlled such that the temperature of the surface or its vicinity of the heating roller 108 is adjusted substantially to the first predetermined value $T_1$. The second predetermined time $W_2$ is the time required for the counter 518 to count down from the predetermined number to zero, and is, for example, 10 to 15 minutes. When the power switch 282 is closed, the waiting flag 308 is set at logic "1" to energize the waiting display lamp 296. When the heating by the electrical heating means 106 causes the temperature detected by the temperature detecting means 277 to exceed the first predetermined value $T_1$, the waiting flat 308 is reset to logic "0" to deenergize the waiting display lamp 296. On the other hand, when it is judged in step n5-9 that the power switch 282 is closed, after the counter 518 has performed counting down and the number kept by the counter 518 has become zero in step n5-12 (in other words, after the second predetermined time $W_2$ has elapsed after the opening of the power switch 282), step n5-13 sets in. In step n5-13, it is judged whether the counter 518 is zero, and thereafter step n5-2 agains sets in. Accordingly, when at time $t_{10}$ which is after the opening of the power switch 282 and further elapsing of the second predetermined period of time $W_2$, the power switch 282 is again closed to turn on the power supply, the electrical heating means 106 is controlled such that the temperature of the surface or its vicinity of the heating roller 108 is adjusted substantially to the second predetermined value $T_2$ which is higher than the first predetermined value $T_1$. A detailed description of the controlling of the electrical heating means 106 on the basis of the signal from the detecting device 281 including the temperature detecting means 277 is omitted here since it is given hereinafter.

In the illustrated embodiment, the first predetermined time $W_1$ and the second predetermined time $W_2$ are measured by one backup-type counter 518. If desired, two such counters may be used so that one of them is used to measure the first predetermined time $W_1$, and the other to measure the second predetermined time $W_2$.

As stated hereinabove, in the heat fixing device 104 equipped with the control system described above, the temperature of the surface or its vicinity of the heating roller 108 is usually kept substantially at the second predetermined value $T_2$ higher than the first predetermined value $T_1$ suitable for heat fixing after the power supply has been turned on, and thereafter it is maintained substantially at the first predetermined value $T_1$. It is possible therefore to bring the temperature of the surface or its vicinity of the heating roller 108 and the ambient temperature to a temperature suitable for heat fixing within a short period of time, and the waiting time after the application of power can be shortened.

Furthermore, since the temperature of the surface or its vicinity of the heating roller 108 is maintained substantially at the third predetermined value $T_3$ lower than the first predetermined value $T_1$ suitable for heat fixing by the operation of the power saving means 512, power consumption can be reduced by utilizing the power saving means when there is a considerable time interval between copying cycles.

Furthermore, when the power supply is again turned on before the lapse of the second predetermined period of time $W_2$ after the turning off of the power supply (the opening of the power switch 282), the temperature of the surface or its vicinity of the heating roller 108 is maintained substantially at the first predetermined value $T_1$. Accordingly, the aforesaid temperature and the ambient temperature can be brought to a value suitable for heat fixation within short period of time.

Electrical Detecting Device

Figure 7:
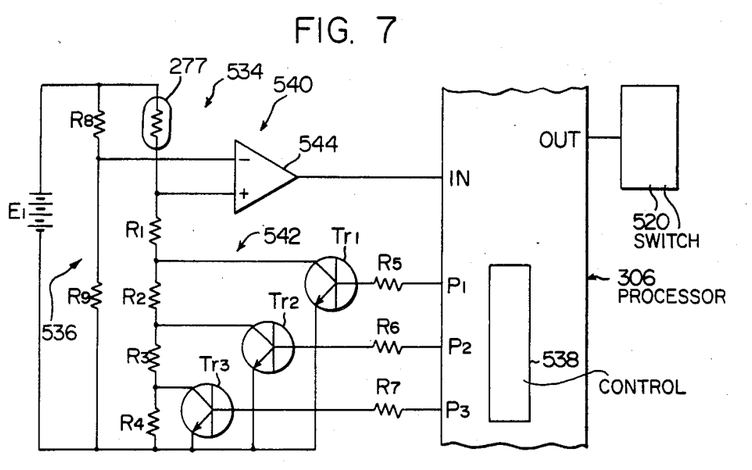
FIG. 7 is a circuit diagram showing a detecting device for a heat fixing device in the copying apparatus shown in FIG. 1.

In the electrostatic copying apparatus improved in accordance with this invention, an electrical detecting device shown in FIG. 7 is used as the aforesaid detecting device 281 (FIG. 4) provided in relation to the heat fixing device 104 (FIG. 1). With reference to FIG. 7, this electrical detecting device includes a first circuit portion 534, a second circuit portion 536, a switching control means 538 included in the processing means 306, a comparison means 540 and a DC power supply $E_1$. The first circuit portion 534 includes the aforesaid temperature detecting means 277 (constituting an electrical detecting element) such as a thermistor for detecting the temperature of the surface, or its vicinity, of the heating roller 108, and a variable voltage dividing circuit 542 connected in series to the temperature detecting means 277. The variable voltage dividing circuit 542 has resistance elements $R_1$, $R_2$, $R_3$ and $R_4$ and transistors $Tr_1$, $Tr_2$ and $Tr_3$ constituting switching means. The resistance elements $R_1$, $R_2$, $R_3$ and $R_4$ are connected to each other in series. The transistor $Tr_1$ is connected parallel to a series circuit portion composed of the resistance elements $R_2$, $R_3$ and $R_4$, and the transistor $Tr_2$ is connected parallel to a series circuit portion composed of the resistance elements $R_3$ and $R_4$. Thus, as one or another of the transistors $Tr_1$, $Tr_2$, $Tr_3$ is switched to its state of conduction, the resistance of variable voltage dividing circuit 542 varies. The transistor $Tr_3$ is connected parallel to the resistance element $R_4$. The bases of these transistors $Tr_1$, $Tr_2$ and $Tr_3$ are connected respectively to output terminals $P_1$, $P_2$ and $P_3$ of the switching control means 538 through resistance elements $R_5$, $R_6$ and $R_7$. The switching control means 538 will be described in detail hereinafter. The second circuit portion 536 has resistance elements $R_8$ and $R_9$ connected to each other in series. The second circuit portion 536 and the aforesaid first circuit portion 534 are connected parallel to each other across the DC power supply $E_1$. The comparison means 540 is constructed of a comparator 544. The non-inverted input terminal of the comparator 544 is connected to a point of connection between the temperature detecting means 277 and the variable voltage dividing circuit 542 in the first circuit portion 534, and its inverted input terminal is connected to a point of connection between the resistance elements $R_8$ and $R_9$ in the second circuit portion 536. On the other hand, the output terminal of the comparator 544 is connected to an input terminal IN of the heating control means included in the processing means 306. Thus, when a first divided voltage at the point of connection between the temperature detecting means 277 and the variable voltage dividing circuit 542 becomes equal to, or below, a second divided voltage (acting as a reference voltage) of the point of connection between the resistance elements $R_8$ and $R_9$, a signal of logic "0" is produced in the comparator 544. This logic "0" signal is fed into the heating control means formed of memory 516 and first heater counter 518 (FIG. 14). When the first divided voltage becomes higher than the second divided voltage, a signal of logic "1" is produced in the comparator 544 and is fed to the heating control means. A signal produced in the heating control means on the basis of the signal from the comparator 544 is fed to the switch means 520, and the switch means 520 is opened or closed on the basis of this signal. As stated above, when the switch means 520 is closed, the electrical heating means 106 (FIGS. 1 and 4) is energized. When the switch means 520 is opened, the electrical heating means 106 is deenergized. The switch means 520 is also opened or closed by the power control means as stated hereinabove.

Figure 8:
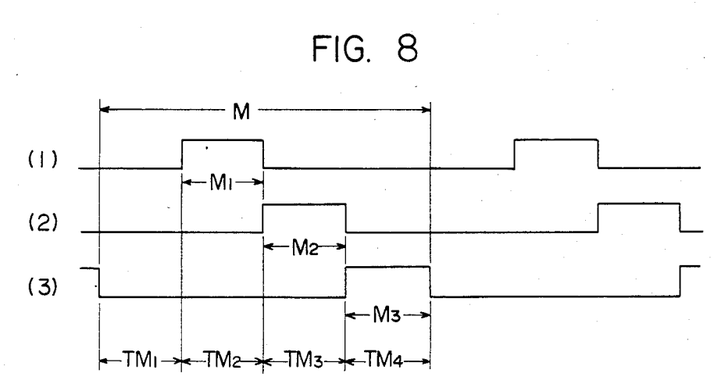
FIG. 8 is a diagram showing signals delivered from a switching control means in the detecting device shown in FIG. 7.

Now, the switching control means 538 will be described. FIG. 21 depicts output voltage as a function of time. The signals shown in FIG. 8 are delivered respectively from the output terminals $P_1$, $P_2$ and $P_3$ of the switching control means 538. A high level signal of a cycle M with a pulse width $M_1$ shown by (1) in FIG. 8 is delivered from the output terminal $P_1$. From the output terminal $P_2$, a high level signal of a cycle M with a pulse width $M_2$ as shown by (2) in FIG. 8 is delivered. The high level signal with a pulse width $M_2$ is delivered according to the falling of the high level signal with a pulse width $M_1$. Furthermore, a high level signal of a cycle M having a pulse width $M_3$ shown by (3) in FIG. 8 is delivered from the output terminal $P_3$. The high level signal with a pulse width $M_3$ is delivered according to the falling of the high level signal with a pulse width $M_2$. In the illustrated embodiment, the pulse widths $M_1$, $M_2$ and $M_3$ of the high level signals are the same and set at one-fourth of the cycle M. The resistance values of the resistance elements $R_1$, $R_2$, $R_3$ and $R_4$ of the variable voltage dividing circuit 542 are selected such that in a first timing period $TM_1$ (when a high level signal is not delivered from the switching control means 538), the first divided voltage does not become lower than the second divided voltage unless the resistance value of the temperature detecting means 277 becomes larger than that at the lowest expected temperature ($-20°$ C. in the illustrated embodiment); that in a second timing period $TM_2$ (when the high level signal with a pulse width $M_1$ is delivered from the switching control means 538), the first divided voltage does not become lower than the second divided voltage unless the resistance value of the temperature detecting means 277 becomes higher than that at the aforesaid second predetermined value $T_2$ (about 190° C.); that in a third timing period $TM_3$ (when the high level signal with a pulse width $M_2$ is delivered from the switching control means 538), the first divided voltage does not become lower than the second divided voltage unless the resistance value of the temperature detecting means 277 becomes higher than that at the aforesaid first predetermined value $T_1$ (about 180° C.); and that in a fourth timing period $TM_4$ (when the high level signal with a pulse width $M_3$ is delivered from the switching control means 538), the first divided voltage does not become lower than the second divided voltage unless the resistance value of the temperature detecting means 277 becomes higher than that at the aforesaid third predetermined value $T_3$ (about 160° C.). The second divided voltage can be set at a suitable value by varying the resistance values of the resistance elements $R_8$ and $R_9$.

Now, the operation and effect of the detecting device will be described. When no high level signal is delivered from the switching control means 538 (during the first timing period $TM_1$), the transistors $Tr_1$, $Tr_2$ and $Tr_3$ are held at cut off, and the current from the DC power supply $E_1$ flows through the temperature detecting means 277 and the resistance elements $R_1$, $R_2$, $R_3$ and $R_4$. In this case, therefore, the voltage between the two terminals of the series circuit portion composed of the resistance elements $R_1$, $R_2$, $R_3$ and $R_4$ is the first divided voltage, and in the comparator 544, this first divided voltage is compared with the second divided voltage. When it is found that the first divided voltage is higher than the second divided voltage [in other words, when the detected temperature of the temperature detecting means 277 is higher than the lowest expected temperature ($-20°$ C.)], the output signal of the comparator 544 becomes logic "1". When the first divided voltage is equal to, or lower than, the second divided voltage [in other words, when the detected temperature of the temperature detecting means 277 is equal to, or lower than, the lowest expected temperature; but since such an instance is not normal, when a trouble (such as wire breaks if a thermistor is used) occurs in the temperature detecting means 277], the output signal of the comparator 544 becomes logic "0". It is possible therefore to determine by the output signal from the comparator 544 during the first timing period $TM_1$ whether the temperature detecting means 277 gets out of order.

When the high level signal with a pulse width $M_1$ is delivered from the switching control means 538 (during the second timing period $TM_2$), the transistor $Tr_1$ conducts, and the current from the DC power source $E_1$ flows through the temperature detecting means 277, the resistance element $R_1$ and the transistor $Tr_1$. Hence, in this case, the voltage between the two terminals of the resistance element $R_1$ is the first divided voltage, and this first divided voltage is compared with the second divided voltage in the comparator 544. When it is found that the first divided voltage is higher than the second divided voltage [in other words, when the detected temperature of the temperature detecting means 277 is higher than the second predetermined value $T_2$ (about 190° C.)], the output signal of the comparator 544 becomes logic "1". When the first divided voltage is equal to, or lower than, the second divided voltage [in other words, when the detected temperature of the temperature detecting means 277 is equal to, or lower than, the second predetermined value $T_2$ (about 190° C.)], the output signal of the comparator 544 becomes logic "0". Thus, it is possible to determine by the output signal from the comparator 544 during the second timing period $TM_2$ whether the detected temperature of the temperature detecting means 277 is equal to, or lower than, the second predetermined value $T_2$.

When the high level signal with a pulse width $M_2$ is delivered from the switching control means 538 (during the third timing period $TM_3$), the transistor $Tr_2$ conducts, and the current from the DC power supply $E_1$ flows through the temperature detecting means 277, the resistance elements $R_1$ and $R_2$ and the transistor $Tr_2$. In this case, therefore, the voltage between the two terminals of the series circuit portion composed of the resistance element $R_1$ and $R_2$ is the first divided voltage, and this first divided voltage is compared with the second divided voltage in the comparator 544. When the first divided voltage is found to be higher than the second divided voltage [in other words, when the detected temperature of the temperature detecting means 277 is higher than the aforesaid first predetermined value $T_1$ (about 180° C.)], the output signal of the comparator 544 becomes logic "1". When the first divided voltage is equal to, or lower than, the second divided voltage [in other words, when the detected temperature of the temperature detecting means 277 is equal to, or lower than, the first predetermined value $T_1$ (about 180° C.)], the output signal of the comparator 544 becomes logic "0". It is possible therefore to determine by the output signal from the comparator 544 during the third timing period $TM_3$ whether the detected temperature of the temperature detecting means 277 is equal to, or lower than, the first predetermined value $T_1$.

When the high level signal with a pulse width $M_3$ is delivered from the switching control means 538 (during the fourth timing period $TM_4$), the transistor $Tr_4$ conducts, and the current from the DC power source $E_1$ flows through the temperature detecting means 277, the resistance elements $R_1$, $R_2$ and $R_3$ and the transistor $Tr_3$. In this case, therefore, the voltage between the two terminals of the series circuit portion composed of the resistance elements $R_1$, $R_2$ and $R_3$ is the first divided voltage, and this first divided voltage is compared with the second divided voltage in the comparator 544. When it is found that the first divided voltage is higher than the second divided voltage [in other words, when the detected temperature of the temperature detecting means 277 is higher than the aforesaid third predetermined value $T_3$ (about 160° C.)], the output signal of the comparator 544 becomes logic "1". When the first divided voltage is equal to, or lower than, the second divided voltage [in other words, when the detected temperature of the temperature detecting means 277 is equal to, or lower than, the third predetermined value $T_3$ (about 160° C.)], the output signal of the comparator 544 becomes logic "0". It is possible therefore to determine by the output signal from the comparator 544 during the fourth timing period $TM_4$ whether the detected temperature of the temperature detecting means 277 is equal to, or lower than, the third predetermined value $T_3$.

As stated hereinabove, in the illustrated detecting device, not only a plurality of predetermined temperatures but also trouble in the temperature detecting means 277 itself can be detected by a single temperature detecting means 277. The detecting device is characterized by the fact that trouble in the temperature detecting means 277 can be promptly detected.

The output signal of the comparator 544 produced as above is fed to the heating control means of the processing means 306, and the switch means 520 is opened or closed by a signal produced in the heating control means on the basis of the signal fed from the comparator 544. More specifically, when the second predetermined value $T_2$ (about 190° C.) is set in the heating control means, only the output signal of the comparator 544 produced during the second timing period $TM_2$ is utilized. When this output signal is logic "0", an actuating signal is produced in the heating control means to close the switch means 520. On the other hand, when this output signal is logic "1", an operation stopping signal is produced in the heating control means to open the switch means 520. It will be readily seen from the foregoing description that when the second predetermined value $T_2$ is set, the electrical heating means 106 is controlled by the output signal of the comparator 544 produced during the second timing period $TM_2$, and consequently, the temperature of the surface or its vicinity of the heating roller 108 is adjusted substantially to the second predetermined value $T_2$.

When the first predetermined value $T_1$ (about 180° C.) is set in the heating control means, only the output signal of the comparator 544 produced during the third timing period $TM_3$ is utilized. When this output signal is logic "0", the switch means 520 is closed, and when this output signal is logic "1", the switch means 520 is opened. Accordingly, when the first predetermined value $T_1$ is set, the electrical heating means 106 is controlled by the output signal of the comparator 544 produced during the third timing period $TM_3$, and consequently the temperature of the surface or its vicinity of the heating roller 108 is adjusted substantially at the first predetermined value $T_1$.

When the third predetermined value $T_3$ (about 160° C.) is set in the heating control means, only the output signal of the comparator 544 produced during the fourth timing period $TM_4$ is utilized. When this output signal is logic "0", the switch means 520 is closed as stated hereinabove. On the other hand, when this output is logic "1", the switch means 520 is opened. Hence, when the third predetermined value $T_3$ is set, the electrical heating means 106 is controlled by the output signal of the comparator 544 produced during the fourth timing period $TM_4$, and consequently, the temperature of the surface or its vicinity of the heating roller 108 is adjusted substantially at the third predetermined value $T_3$.

Figure 9:
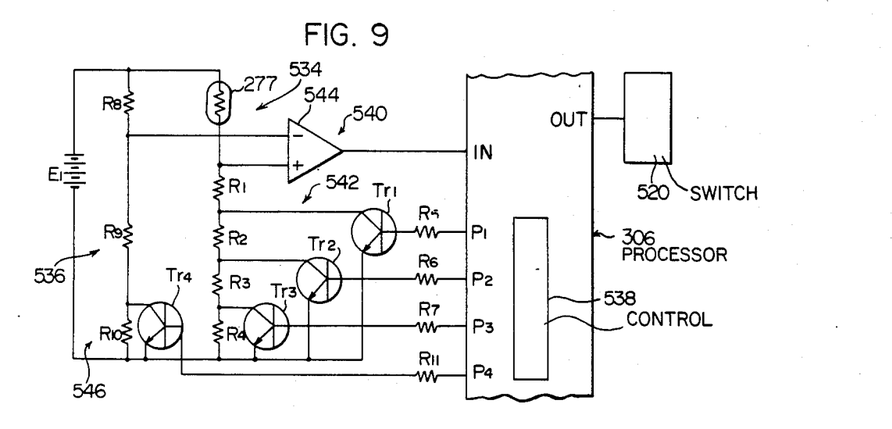
FIG. 9 is a circuit diagram showing a modified example of the detecting device shown in FIG. 7.

FIG. 9 shows a modified example of the electrical detecting device. In this figure, substantially the same parts as those in the aforesaid embodiment are designated by the same reference numerals. In the embodiment shown in FIG. 9, the second linear-connected circuit portion 536 of the electrical detecting device further comprises a parallel circuit 546 connected in series to the resistance elements $R_8$ and $R_9$. The parallel circuit 546 has an additional resistance element $R_{10}$ and a transistor $Tr_4$ constituting an additional switching means connected parallel to the resistance element $R_{10}$. The base of the transistor $Tr_4$ is connected to the output terminal $P_4$ of the switching control means 538 through a resistance element $R_{11}$. Otherwise, the structure of the detecting device in the modified example is substantially the same as that of the embodiment described hereinabove.

Figure 10:
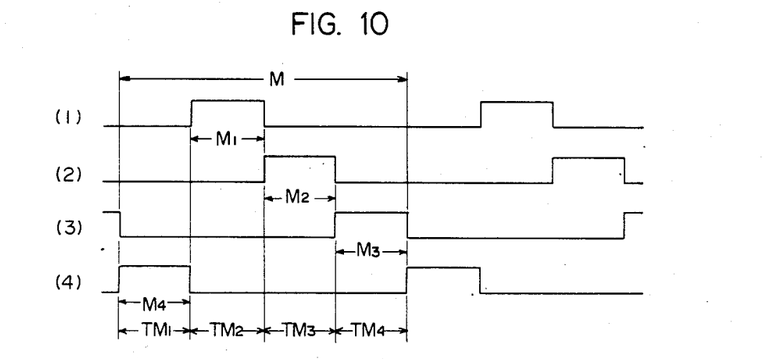
FIG. 10 is a diagram showing signals delivered from a switching control means in the modified example of the detecting device of FIG. 9.

The signals shown in FIG. 10 are delivered from the output terminals $P_1$, $P_2$, $P_3$ and $P_4$ of the switch control means 538. From the output terminal $P_1$, a high level signal of a cycle M with a pulse width $M_1$ as shown by (1) in FIG. 23 is delivered. This high level signal with a pulse width $M_1$ is delivered according to the falling of a high level signal with a pulse width $M_4$ which will be described hereinafter. Substantially the same high level signals as the aforesaid high level signal, shown by (2) and (3) in FIG. 23, are respectively delivered from the output terminals $P_2$ and $P_3$. Furthermore, a high level signal of a cycle M with a pulse width $M_4$ shown by (4) in FIG. 10 is delivered from the output terminal $P_4$. The high level signal with a pulse width $M_4$ is delivered according to the falling of the high level signal having a pulse width $M_3$. The resistance value of the resistance element $R_{10}$ in the parallel circuit 546 is selected such that during the first timing period $TM_1$ (when the high level signal having a pulse width $M_4$ is delivered from the switching control means 538), the first divided voltage does not become lower than the second divided voltage unless the resistance value of the temperature detecting means 277 becomes higher than that at the lowest delivered temperature (−20° C. in the illustrated embodiment).

When a high level signal with a pulse width $M_4$ is delivered from the switching control means 538 in this detecting device (during the first timing period $TM_1$), the transistor $Tr_4$ conducts, and the current from the DC power supply $E_1$ flows through the resistance elements $R_8$ and $R_9$ and the transistor $Tr_4$. In this case, therefore, the voltage between the two terminals of the resistance element $R_9$ is the second divided voltage, and in the comparator 544, this second divided voltage is compared with the first divided voltage (which, in this case, is the voltage between the two terminals of the series circuit portion composed of the resistance elements $R_1$, $R_2$, $R_3$ and $R_4$). On the other hand, when a high level signal with a pulse width $M_1$, a high level signal with a pulse width $M_2$, or a high level signal with a pulse width $M_3$ is delivered from the switching control means 538 (during the second timing period $TM_2$, the third timing period $TM_3$ or the fourth timing period $TM_4$), the transistor $Tr_4$ is held at cut off, and the current from the DC power supply $E_1$ flows through the resistance elements $R_8$, $R_9$ and $R_{10}$. In this case, therefore, the voltage between the two terminals of the series circuit portion composed of the resistance elements $R_9$ and $R_{10}$ is the second divided voltage, and is compared with the first divided voltage in the comparator 544. Otherwise, the operation and effect of the detecting device in the modified example are nearly the same as those in the embodiment illustrated in FIG. 7.

In the detecting device in the modified example described above, the second divided voltage is increased during the first timing period $TM_1$. It is possible to maintain the resistance value of the resistance element $R_4$ of the first circuit portion 534 at a lower value and the resistance values of the resistance elements $R_1$, $R_2$ and $R_3$ at higher values than in the embodiment described hereinabove. As a result, the currents flowing through the temperature detecting means 277 during the second, third and fourth timing periods $TM_2$, $TM_3$ and $TM_4$ can be reduced, and the amount of heat generated in the temperature detecting means 277 itself can be decreased.

The illustrated embodiments have been described with regard to an example in which the detecting device is applied to the detecting device 281 including the temperature detecting means 277 (FIG. 4). If desired, it is also possible to apply such a detecting device to the detecting device 283 including the temperature detecting means 279 (FIG. 3). In the latter case, only one temperature value is preset, and therefore, the resistance elements $R_2$ and $R_3$ and the transistors $Tr_2$ and $Tr_3$ can be omitted.

Furthermore, in the illustrated embodiments, the temperature is detected by using the temperature detecting means 277. If desired, elements other than temperature can be detected by using a detecting element whose resistance value changes with a change in the amount of detection, instead of the temperature detecting means 277.

While the present invention has been described hereinabove with reference to the accompanying drawings showing the preferred embodiments of the copying apparatus constructed in accordance with this invention, it should be understood that the present invention is no way limited to these specific embodiments, and various changes and modifications are possible without departing from the scope of this invention.

What is claimed is:

1. A detecting device comprising:
    a first circuit portion including an electrical detecting element whose resistance varies according to changes in a parameter to be detected and a variable voltage dividing circuit connected in series with said detecting element, said variable voltage dividing circuit having at least two resistance elements connected in series with each other and at least one switching means connected in parallel with those resistance elements of said at least two resistance elements which are other than at least one thereof in order to selectively vary the resistance of the variable voltage dividing circuit,
    a direct-current power supply for applying direct-current power to said first circuit portion,
    a switching control means for maintaining said switching means in conduction for a predetermined period of time with a predetermined cycle, and
    a comparison means for comparing a first divided voltage at a point of connection between said detecting element and said variable voltage dividing circuit with a standard voltage, the results of such comparison indicating detection of the change in the parameter.

2. The detecting device of claim 1 wherein the resistances of the resistance elements are selected so that when said switching means is not in conduction and the total resistance of said variable voltage dividing circuit is at the highest value thereof, said first divided voltage does not fall below said standard voltage unless the resistance of said detecting element exceeds a preset value.

3. The detecting device of claim 1 which includes a second circuit portion having at least two resistance elements connected in series with each other, said second circuit portion being connected in parallel with said first circuit portion, and in which said standard voltage is a second divided voltage at a point of connection between said resistance elements in said second circuit portion.

4. The detecting device of claim 3 wherein said second circuit portion includes a parallel-connected circuit connected in series with said at least two resistance elements for selectively varying said second divided voltage, said parallel-connected circuit including an additional resistance element and an additional switching means connected parallel thereto, and wherein said switching control means maintains said additional switching means in said parallel-connected circuit in conduction when said switching means in said variable voltage dividing circuit is not conducting.

5. The detecting device of claim 1 wherein the resistance of the electrical detecting element varies according to changes in temperature.

6. The detecting device of claim 5 wherein said electrical detecting element is a thermistor whose resistance decreases when the temperature rises.

7. A detecting device comprising:
    a first circuit portion including an electrical detecting element whose resistance varies according to changes in a parameter to be detected and a variable voltage dividing circuit connected with said detecting element, said variable voltage dividing circuit having at least two resistance elements and at least one switching means for selectively varying the resistance of the variable voltage dividing circuit,
    a power input means adapted for connection to a direct-current power supply for applying direct current power to said first circuit portion,
    a switching control means for maintaining said switching means in conduction for a predetermined period of time with a predetermined cycle, and a comparison means for comparing a first divided voltage at a point of connection of said detecting element and said variable voltage dividing circuit with a standard voltage, the results of such comparison indicating detection of the change in the parameter.

8. A detecting device as claimed in claim 7 wherein said voltage dividing circuit is connected in series with said detecting element.

* * * * *